US007817501B2

(12) United States Patent
Groothuis

(10) Patent No.: US 7,817,501 B2
(45) Date of Patent: Oct. 19, 2010

(54) MECHANISM FOR MOVING AN INDICATOR OF A CLOCK

(75) Inventor: Michiel Groothuis, St. Imier (CH)

(73) Assignee: Ronda AG, Lausen (CH)

( * ) Notice: Subject to any disclaimer, the term of this patent is extended or adjusted under 35 U.S.C. 154(b) by 34 days.

(21) Appl. No.: 12/199,251

(22) Filed: Aug. 27, 2008

(65) Prior Publication Data

US 2008/0310259 A1 Dec. 18, 2008

Related U.S. Application Data

(63) Continuation of application No. PCT/EP2007/052563, filed on Mar. 19, 2007.

(30) Foreign Application Priority Data

Mar. 30, 2006 (CH) .................................... 0509/06

(51) Int. Cl.
*G04B 19/02* (2006.01)

(52) U.S. Cl. ......................... 368/220; 368/28; 368/221; 368/223

(58) Field of Classification Search ................. 368/220, 368/221, 223, 28, 35
See application file for complete search history.

(56) References Cited

U.S. PATENT DOCUMENTS

| | | | |
|---|---|---|---|
| 2,292,458 A | 8/1942 | Maser | |
| 3,696,609 A | 10/1972 | Dubois | |
| 4,036,005 A * | 7/1977 | Jauch | 368/269 |
| 4,192,136 A * | 3/1980 | Robinson | 368/222 |
| 5,043,955 A | 8/1991 | Dubois et al. | |

FOREIGN PATENT DOCUMENTS

| | | |
|---|---|---|
| CH | 666591 | 8/1988 |
| CH | 691087 | 4/2001 |
| EP | 0869410 A | 10/1998 |
| EP | 1102134 | 5/2001 |
| EP | 1555584 | 7/2005 |
| FR | 548785 | 3/1922 |
| FR | 743618 | 10/1932 |
| FR | 2863368 A | 6/2005 |
| WO | WO 2005054962 A1 * | 6/2005 |

OTHER PUBLICATIONS

International Search Report dated Jan. 28, 2008.

* cited by examiner

*Primary Examiner*—Vit W Miska
*Assistant Examiner*—Jason Collins
(74) *Attorney, Agent, or Firm*—Pearne & Gordon LLP

(57) ABSTRACT

A mechanism for setting a clock hand indicates for example a date in defined positions of a scale. The mechanism includes a cam disc and a first rake which is connected to the cam disc in a force-transmitting manner and has teeth which engage into the teeth of a pinion and transmit a force. A second rake has teeth that engage into the teeth of the pinion. The second rake exerts a force on the teeth of the pinion that is opposite to the force exerted by the first rake exerts on the pinion. The first rake and the second rake are arranged so as to overlap, and the second rake can be borne pivotally around the first axle. The embodiment has the advantage that it is space-saving and the rakes stabilize one another mutually.

17 Claims, 1 Drawing Sheet

MECHANISM FOR MOVING AN INDICATOR OF A CLOCK

REFERENCE DATA

Figure 1:
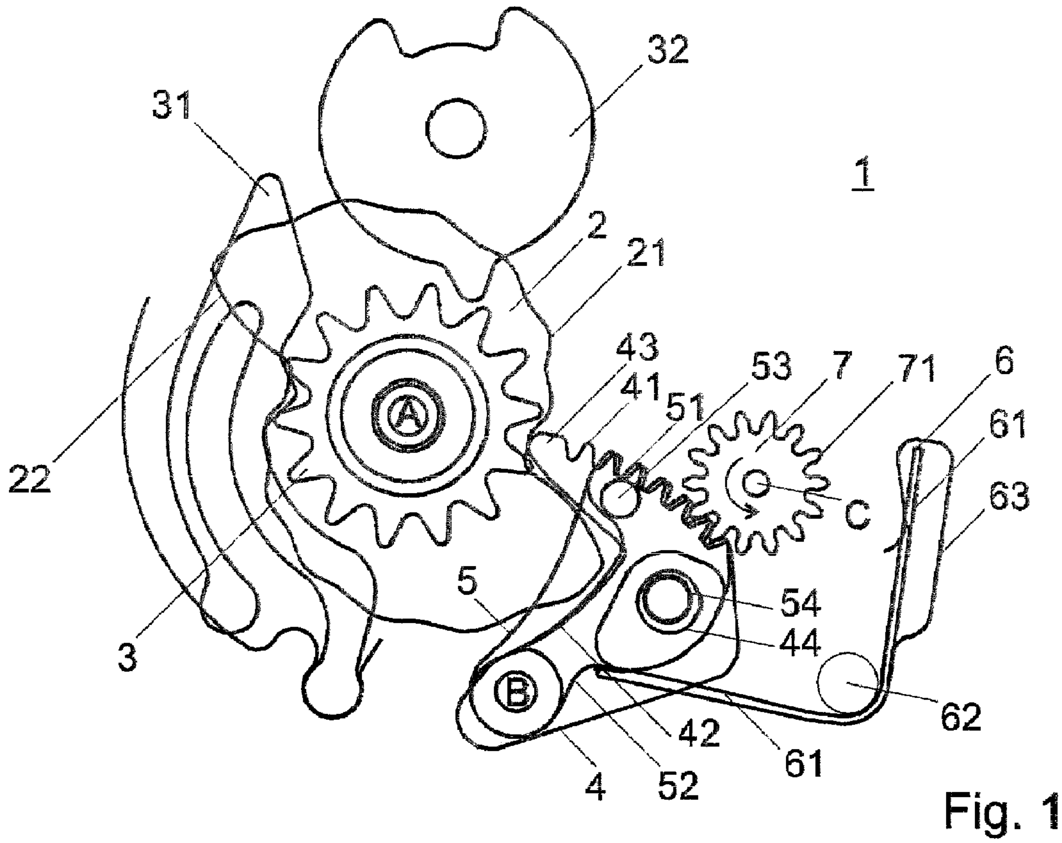

This application is a continuation of international PCT patent application EP2007/052563 (WO07113098) filed on Mar. 19, 2007, claiming priority from Swiss patent application 2006CH-00509 of Mar. 30, 2006, the contents whereof are hereby incorporated by reference.

TECHNICAL FIELD

The invention refers to a mechanism for moving an indicator of a clock according to the preamble of the independent claim.

State of the Art

Clocks and clockworks that drive hands are known in large numbers from the state of the art. The invention refers to a mechanism for driving a hand that is moved from one extreme position to another extreme position and is however afterwards reset in the same way without performing a whole turn. The hand in that case stands at certain positions of a scale in order to indicate the date or the time.

CH-A3-666 591 discloses in a general form such a mechanism, which consists essentially of a cam disc that is connected with a star-shaped pinion. Both are arranged around an axle and rotate around this axle. The star-shaped pinion, which has seven teeth and rotates gradually, is held in this position at each position by a lever that engages into the grooves of the teeth. Accordingly, seven different positions of the cam disc can be adjusted, and a finger of a rake, which is connected in a force-transmitting manner with the cam disc, slides along the outline of the cam disc and adapts to the outline. The outline of the cam disc is designed in such a manner that there are seven different positions that have a slightly different level from the remaining outline, so that the finger finds support. The rake thus shifts stepwise and the teeth of the rake, which engage into the teeth of a pinion of the hand, move the hand, which in each case is shifted accordingly by a corresponding angle. The hand is connected with a spring that resets the hand and generates a force that acts on the hand and the rake.

Less advantageous, however, regarding the outline of the cam disc in CH-A3-666,591 is that the distances between the discrete positions are relatively large, so that the switching moments last relatively long, which can have a negative effect especially during the resetting of the hand.

Such mechanisms are also known from FR-A548,785, FR-A-743,618 and U.S. Pat. No. 3,696,609. It is however the case that that a spring applies a force directly to the rake and stabilizes the rake in its position. In FR-A-548,785, a pinion is turned by a certain angle, there is however no resetting of the hand.

U.S. Pat. No. 5,043,955 likewise discloses such a mechanism, wherein four rakes are arranged around a single central cam disc. The four rakes each drive a hand that is placed at the four corners of a square clock. The rakes are pressed with a spring onto the outline of the cam disc. The spring has two shanks and is fastened at one point.

EP-A1-1,102,134 discloses a clock with such a mechanism, wherein two rakes are arranged around a central cam disc. The characteristic here lies in the fact that the rakes consist of two shanks, wherein one shank is connected in a force-transmitting manner with the outline of the cam disc and the second shank has teeth that set the hand. Both shanks gather at a common point and are borne in a tiltable manner around this point.

U.S. Pat. No. 2,292,458 discloses a similar mechanism, which additionally ensures a linear shift of two hands.

A further embodiment is revealed in CH-A5-691 087. In order to adjust the play between the teeth of a first rake and the teeth of the pinion, a second rake is provided. The rake is provided on the other side of the pinion and exerts a force on the pinion opposite to the force of the first pinion. Less favorable is however that this arrangement requires very much space, since the rakes are arranged on two different sides of the pinion. Through the size of the cam disc, furthermore, geometrical changes are hardly possible in order to transfer the system to another application.

In order to compensate for the play of the teeth of a pinion, it is also known from EP-A1-1,555,584 to modify the teeth. Through certain gaps and columns, the teeth can adapt to the respective application and the play can be reduced to a certain measure.

Representation of the Invention

It is an aim of the invention to create a mechanism for moving an indicator of a clock that is more space-saving than the mechanisms known from the state of the art.

It is another aim of the invention to create a mechanism for moving an indicator of a clock that eliminates or reduces to a large extent the play between the teeth of a rake and the teeth of a pinion in one of the previously mentioned mechanisms.

It is a further aim of the invention to create a mechanism for moving an indicator of a clock that leaves the technical designer a larger degree of freedom when designing than the mechanisms known from the state of the art.

According to the invention, these aims are achieved with a mechanism for moving an indicator of a clock according to the preamble of the independent claim in that the first rake and the second rake are arranged so as to overlap.

The embodiment has the advantage that it is space saving and the rakes stabilize each other mutually through the overlapping arrangement. This can be assisted by an additional fastening element that has a certain play. Thanks to the inventive mechanism, a play and oscillations are avoided when changing the position of the indicator. The latter thus remains at a fixed position, even if the clock is moved by the user.

The rakes can also be borne pivotally around the one common axle, which has the advantage that an additional axle and associated fastening means can be done without. The division of the teeth and also the module of the two rakes can be different for both rakes, so that the technical designer advantageously has an additional degree of freedom when designing a certain execution form.

So that the second rake can exert force on the pinion, it is which is connected in a force-transmitting manner with a spring, which acts on a recess of the second rake, which is arranged on a side opposite the cam disc. The spring can have two shanks and be borne at a fixed point.

The cam disc, which is connected with a pinion, has an outline such that the first rake stops in several discrete positions at each turn of the cam disc. In a concrete embodiment, the cam disc is a snail and consists of two shifted ellipsoid or semi-circle-shaped elements, there being a notch in the outline of the cam disc.

For a simpler production, one or both rakes and also the pinion that drives the indicator can be made of a plastic material. Further advantageous embodiments are indicated in the dependent claims.

SHORT DESCRIPTION OF THE FIGURES

Figure 2:
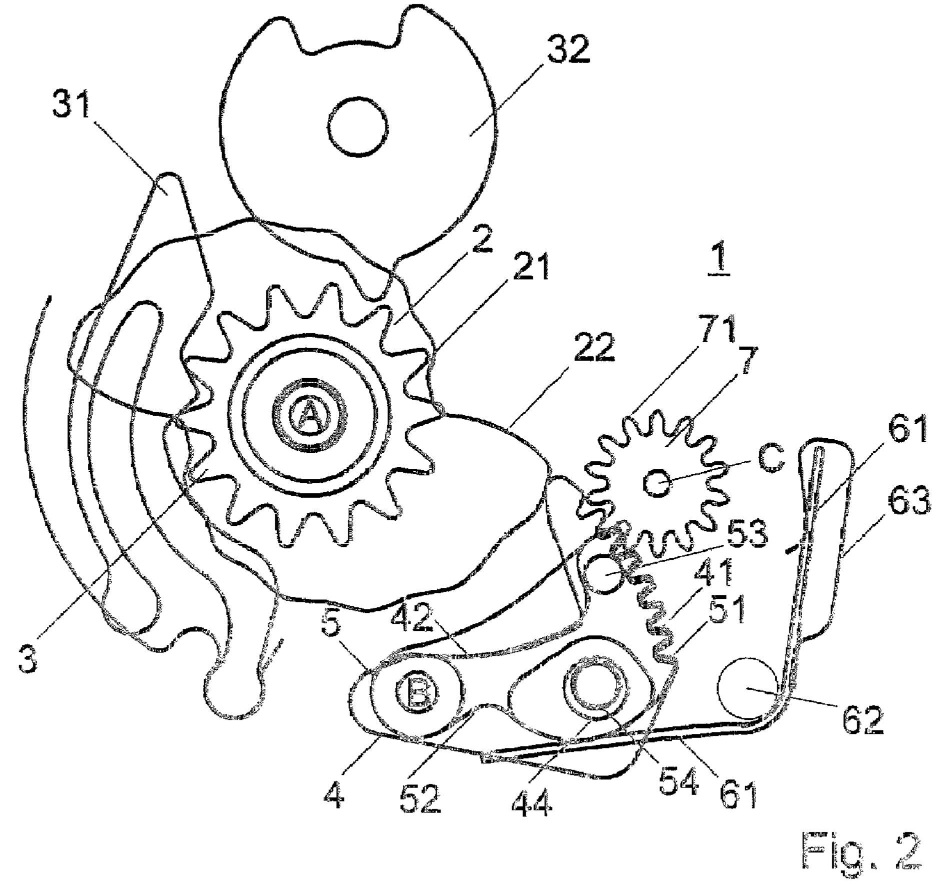

The invention will be explained in more detail on the basis of the attached figures, which show:

FIG. 1, a view of a mechanism for adjusting a watch hand in a resetting position, and FIG. 2, a view of a mechanism for adjusting a watch hand in a maximum position.

WAYS FOR EXECUTING THE INVENTION

FIG. 1 shows a mechanism 1 according to invention for moving an indicator of a clock, which moves from one extreme position to another extreme position and is then reset afterwards traveling the same way, without performing a full 360° revolution. The indicator, which is not represented in FIG. 1, is connected with the pinion 7 and thereby stands each time in certain positions of a scale, in order to indicate a day of the week, a date, a time, seconds etc. FIG. 1 shows the mechanism at a maximum position directly after the resetting of the indicator. The indicator can be a watch hand, for example a retrograde watch hand, or also a disk that is partly visible through a window of the clock.

The mechanism consists of a cam disc 2 that is connected with a star 3, which it drives. In the special case that is visible in FIG. 1, the cam disc is a snail. The cam disc 2 has an outline 21 and consists, in the shown embodiment, of two ellipsoid or semi-circle-shaped elements arranged in shifted fashion, there being a notch 22 in the outline 21 of the cam disc 2. The star 3 and the cam disc 2 turn around a common axle A. The star 3 is propelled by a regulating unit 32, which has a nose, and held in each specific position by a lever spring 31.

A first rake 4 is connected in a force-transmitting manner with the cam disc 2. The rake 4, which is borne pivotally around an axle B, has teeth 41 on one side. On the side turned towards the cam disc 2, the rake 4 exhibits an L-shaped recess 42, which on one section forms a finger 43. The finger 43, which is also partly equipped with teeth 41, rests in a force-transmitting manner on the outline 21 of the cam disc 2. The outline 21 of the cam disc 2 has a plurality of slight recesses or spaces of somewhat lower level, so that the first rake 4 stops in several discrete positions at each turn of the cam disc 2. In the shown embodiment, seven segments and positions are intended for each element, which stand each for one day of the week. Altogether, there are thus 14 elements on the cam disc 2. Of course, the number of recesses resp. positions and the concrete form of execution of the cam disc 2, of the outline 21 and of the notches 22 according to the given example and the value to be indicated can vary.

Simultaneously, a pinion 7 is connected with an indicator, not represented in FIG. 1. The pinion 7 thus drives the watch hand or the disk. For this purpose, the pinion 7 has a number of teeth 71, which engage in the teeth 41 of the first rake 4. Through the finger 43 and the teeth 41 of the first rake 4, a force and a movement are transmitted from the cam disc 2 to the pinion 7. The pinion 7 thereby turns around an axle C. The teeth 41 of the rake 4 rest on one side against the teeth 71 of the pinion 7 and thus transmit a force. There is a certain play between the second side of the teeth 41 and the neighboring teeth 71 of the pinion 7.

Because each one of the ellipsoid or semi-circle-shaped elements of the cam disc 2 in respect of the axle A shows an increasing radius, the finger 43 steadily shifts during the turn of the cam disc 2 and the pinion 7 turns in anti-clockwise direction, as indicated with the arrow in FIG. 1. The positions that are available on the outline 21 are transmitted to the positions of the hand that are to be shown. FIG. 2 shows the mechanism 1 after the cam disc 2 has turned by half a revolution. The finger 43 is directly before the notch 22 and thus at a second extreme position, directly before the indicator is reset in one step in clockwise direction to the position shown in FIG. 1.

According to the invention, a second rake 5 is arranged so as to overlap with the first rake 4. The embodiment has the advantage that it saves space and the rakes stabilize each other mutually through the overlapping arrangement. The rake 5 has teeth 51, which likewise engage in the teeth 71 of the pinion 7. In the shown embodiment, the second rake 5 is borne together with the rake 4 pivotally around the first axle B and both elements 4, 5 are connected to one another through a fastening element 44, 54 which keeps both rakes 4, 5 together. It would be however be conceivable in the frame of the invention to design an independent axle. If, as shown, the rakes are borne pivotally around the one common axle B, this has the advantage that an axle and associated attachment elements can be done without. The rake 5 additionally shows a guiding element 53.

Through the shown arrangement, the second rake 5 exerts a force on the teeth 71 of the pinion 7, which is opposite to the force exerted by the first rake 4 on the pinion 7. These forces alone would thus turn the pinion 7 in clockwise direction. Thus the teeth 51 rest against the side of the teeth 71, where there is the mentioned play between the second side of the teeth 41 and the teeth 71 of the pinion 7. In order for the rake to exert this force, a spring 6 is connected thereto in a force-transmitting manner. The spring 6 is arranged in a parallel plane to the rake and at the side of the rake 5 that faces the cam disc 2. On this side, the rake 5 has a recess 52 which can act on the spring 6. In the shown example, the spring 6 has two shanks 61 and is borne at a fixed point 62, where both shanks 61 come together. One shank 61 is held by a fastening element 63. Other springs or power transmission elements are however also conceivable in the frame of the invention.

The division of the teeth 41, 51 and also the module of the two rakes 4, 5 can be different for both rakes 4, 5, so that the technical designer advantageously has an additional degree of freedom when designing a certain execution form of the inventive mechanism. For a simpler production, one or both rakes 4, 5 and also the pinion 7 can be made of a plastic material. This applies in particular to the rake 5, which can be manufactured as a standard part and can thus work in different clockworks with first rakes 4, for example of metal, of different size, division and/or modules.

Through the inventive mechanism, a play and oscillations are avoided by when changing the position of the indicator. The latter thus remains at a fixed position, even if the clock is moved by the user.

LIST OF REFERENCE SYMBOLS

1 Mechanism
2 Cam disc
21 Outline of the cam disc 21
22 Jump in the outline 22 of the cam disc 21
3 Star
31 Lever spring
32 Regulating unit
4 First rake
41 Teeth of the first rake 4
42 Recess
43 Fingers of the rake 4
44 Guiding element
5 Second rake
51 Teeth of the second rake 5

52 Recess
53 Fastening element
54 Guiding element
6 Spring
61 Shank of the spring 6
62 Fixed point of the spring 6
63 Attachment of the spring 6
7 Pinion
71 Teeth of the gear wheel 7
A, B, C Axle

The invention claimed is:

1. Mechanism for moving an indicator of a clock, comprising:

a cam disk;

a first rake that is connected in a force-transmitting manner with the cam disc, borne pivotally around a first axle and having teeth;

a pinion with teeth for driving the indicator, whereby the teeth of the pinion engage into the teeth of the first rake and whereby the teeth of the first rake rest against a side of the teeth of the pinion through the force transmission of the cam disc to the first rake, and a second rake, having teeth that engage into the teeth of the same pinion, wherein the first rake and the second rake are arranged so as to overlap.

2. Mechanism for moving an indicator according to claim 1, characterized in that the second rake exerts a force on the teeth of the pinion that is opposite the force that is exerted by the first rake exercises on the pinion.

3. Mechanism for moving an indicator according to claim 1, characterized in that the second rake is also borne pivotally around the first axis.

4. Mechanism for moving an indicator according to claim 1, characterized in that both rakes have a common fastening element.

5. Mechanism for moving an indicator according to claim 1, characterized in that the division of the teeth is different for both rakes.

6. Mechanism for moving an indicator according to claim 1, characterized in that the module of both rakes is different.

7. Mechanism for moving an indicator according to claim 1, characterized in that the cam disc is a snail.

8. Mechanism for moving an indicator according to claim 1, characterized in that the second rake is connected in a force-transmitting manner with a spring that exerts the force on the second rake.

9. Mechanism for moving an indicator according to claim 8, characterized in that the second rake is provided with a recess on a side opposite to the cam disc and said spring acts on this recess.

10. Mechanism for moving an indicator according to claim 8, characterized in that said spring has two shanks.

11. Mechanism for moving an indicator according to claim 1, characterized in that at least one of the two rakes or the pinion a made of a plastic material.

12. Mechanism for moving an indicator according to claim 11, characterized in that the first rake is made of metal and the second rake of a plastic material.

13. Mechanism for moving an indicator according to claim 1, characterized in that the cam disc has a contour, so that the first rake stops in several discrete positions with a rotation of the cam disc.

14. Mechanism for moving an indicator according to claim 1, characterized in that the cam disc is connected with a star.

15. Mechanism for moving an indicator according to claim 1, characterized in that the first rake has on the side turned towards the cam disc a recess in the shape of an L.

16. Mechanism for moving an indicator according to claim 1, characterized in that of the indicator indicates a day of the week, a date or a time.

17. Mechanism for moving an indicator according to claim 1, characterized in that the indicator is a disc that is partly visible through a window.

* * * * *